(12) United States Patent
Kumano et al.

(10) Patent No.: US 11,333,060 B2
(45) Date of Patent: May 17, 2022

(54) CONTROL DEVICE

(71) Applicant: Hitachi Astemo, Ltd., Hitachinaka (JP)

(72) Inventors: Kengo Kumano, Tokyo (JP);
Masayuki Saruwatari, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/418,917

(22) PCT Filed: Feb. 7, 2020

(86) PCT No.: PCT/JP2020/004727
§ 371 (c)(1),
(2) Date: Jun. 28, 2021

(87) PCT Pub. No.: WO2020/189078
PCT Pub. Date: Sep. 24, 2020

(65) Prior Publication Data
US 2022/0106902 A1 Apr. 7, 2022

(30) Foreign Application Priority Data
Mar. 15, 2019 (JP) ............................. JP2019-048273

(51) Int. Cl.
*F01P 7/14* (2006.01)
*F01P 3/06* (2006.01)

(52) U.S. Cl.
CPC .................................. *F01P 7/14* (2013.01); *F01P 3/06* (2013.01); *F01P 2007/146* (2013.01); *F01P 2025/32* (2013.01); *F01P 2025/60* (2013.01)

(58) Field of Classification Search
CPC .................................... F01P 7/14; F01P 7/167
See application file for complete search history.

(56) References Cited

U.S. PATENT DOCUMENTS 10,012,133 B1 * 7/2018 Martin ............... B60H 1/00978
2007/0261648 A1 * 11/2007 Reckels .................. F01P 7/167
123/41.12

(Continued)

FOREIGN PATENT DOCUMENTS

GB         2552501 A      1/2018
JP      2003-328756 A    11/2003

(Continued)

OTHER PUBLICATIONS

International Search Report (PCT/ISA/210) issued in PCT Application No. PCT/JP2020/004727 dated Jun. 9, 2020 with English translation (five (5) pages).

(Continued)

*Primary Examiner* — Long T Tran
(74) *Attorney, Agent, or Firm* — Crowell & Moring LLP

(57) ABSTRACT

When a coolant controlled to have a constant target temperature is used regardless of a traveling condition of a vehicle, a fuel efficiency of the vehicle may be reduced. Therefore, a VCU 1 predicts the output of an internal combustion engine in a future prediction period on the basis of position information of the vehicle acquired from a positioning unit, traffic information related to a route to a destination, and internal combustion engine control information, determines a target coolant temperature which is the target temperature of the coolant for cooling the internal combustion engine on the basis of the predicted output of the internal combustion engine, sets the change timing for changing the temperature of the coolant to the target coolant temperature on the basis of the predicted output of the internal combustion engine, and controls the operation of the coolant temperature change unit for changing the temperature of the coolant at the change timing so as to reach the (Continued)

target coolant temperature on the basis of the predicted output of the internal combustion engine.

15 Claims, 14 Drawing Sheets

(56) References Cited

U.S. PATENT DOCUMENTS

| | | | |
|---|---|---|---|
| 2007/0272173 A1* | 11/2007 | Reckels | G16Z 99/00 |
| | | | 123/41.11 |
| 2013/0211650 A1* | 8/2013 | Tashiro | B60W 10/06 |
| | | | 180/65.265 |
| 2013/0306302 A1* | 11/2013 | Osaka | B60H 1/32281 |
| | | | 165/287 |
| 2016/0320776 A1 | 11/2016 | Inami et al. | |
| 2016/0368366 A1* | 12/2016 | Miller | B60K 11/085 |
| 2019/0315348 A1* | 10/2019 | Mimura | B60W 30/0956 |
| 2020/0269829 A1 | 8/2020 | Brockley | |
| 2020/0343601 A1* | 10/2020 | Carlson | H01M 10/613 |

FOREIGN PATENT DOCUMENTS

| | | |
|---|---|---|
| JP | 2004-360544 A | 12/2004 |
| JP | 2002-343396 A | 11/2009 |
| JP | 2015-157503 A | 9/2015 |
| JP | 2016-210243 A | 12/2016 |

OTHER PUBLICATIONS

Japanese-language Written Opinion (PCT/ISA/237) issued in PCT Application No. PCT/JP2020/004727 dated Jun. 9, 2020 (five (5) pages).

* cited by examiner

CONTROL DEVICE

TECHNICAL FIELD

The present invention relates to a control device mounted on a vehicle.

BACKGROUND ART

In order to cope with vehicle fuel consumption regulations that are strengthened year by year, the market of hybrid vehicles having a large fuel consumption reduction effect is expanding. A hybrid vehicle includes a motor and an engine as power sources, and can efficiently drive the vehicle by driving both or one of the motor and the engine according to a traveling condition. At the time of deceleration, kinetic energy of the vehicle is regenerated and stored in a secondary battery (power storage device) using a motor as a generator, and motor travel is performed using the stored energy, thereby reducing fuel consumption.

In recent years, from the viewpoint of energy saving and eco-drive, further improvement in fuel efficiency of vehicles is desired. In order to improve fuel efficiency of a vehicle, it is important to suppress wasteful energy consumption. Therefore, a technique for performing engine control disclosed in PTL 1 has been provided. PTL 1 discloses that "When a change in the operation state of the engine is predicted from the travel plan, preceding control for precedingly controlling the control command value of the engine operation control device is started before the predicted change in the driving state of the engine occurs".

CITATION LIST

Patent Literature

PTL 1: JP 2016-210243 A

SUMMARY OF INVENTION

Technical Problem

Meanwhile, in the preceding control for lowering the water temperature disclosed in PTL 1, the coolant temperature is lowered in advance by decreasing the opening degree of the flow rate control valve or increasing the supply power to the electric water pump. Then, when the coolant temperature becomes equal to or lower than a predetermined target temperature, the control for lowering the coolant temperature is terminated. However, a vehicle travels under various traveling conditions such as an expressway and a climbing road, and the engine or the like cannot be sufficiently cooled by the coolant only by preparing a certain target temperature, and knocking may occur. Conversely, if a vehicle travels in an urban area or the like, if the engine or the like is cooled too much, the cooling loss of the engine increases. In any case, an overload is applied to the engine, and fuel efficiency may be reduced.

The invention has been made in view of such a situation, and an object thereof is to appropriately change the temperature of the coolant in accordance with a traveling condition of a vehicle.

Solution to Problem

The invention relates to a control device mounted on a vehicle including an internal combustion engine as a drive source. The control device includes an internal combustion engine output control unit that outputs internal combustion engine control information for controlling an output of the internal combustion engine to the internal combustion engine, an internal combustion engine output prediction unit that predicts an output of the internal combustion engine in a future prediction period based on position information of the vehicle acquired from a positioning unit that measures a position of the vehicle, traffic information related to a route to a destination, and the internal combustion engine control information, a target coolant temperature determination unit that determines a target coolant temperature, which is a target temperature of a coolant for cooling the internal combustion engine, based on the predicted output of the internal combustion engine, a change timing setting unit that sets a change timing for changing a temperature of the coolant to the target coolant temperature based on the predicted output of the internal combustion engine, and a coolant temperature change control unit that controls an operation of a coolant temperature change unit that changes a temperature of the coolant at the change timing based on the predicted output of the internal combustion engine so as to reach the target coolant temperature.

Advantageous Effects of Invention

According to the invention, a target coolant temperature is determined in accordance with the output of an internal combustion engine predicted in a future prediction period, and a coolant temperature is changed so as to reach the target coolant temperature. Therefore, an overload on the internal combustion engine is avoided, and the fuel efficiency of the vehicle can be improved.

Objects, configurations, and effects besides the above description will be apparent through the explanation on the following embodiments.

DESCRIPTION OF EMBODIMENTS

Figure 1:
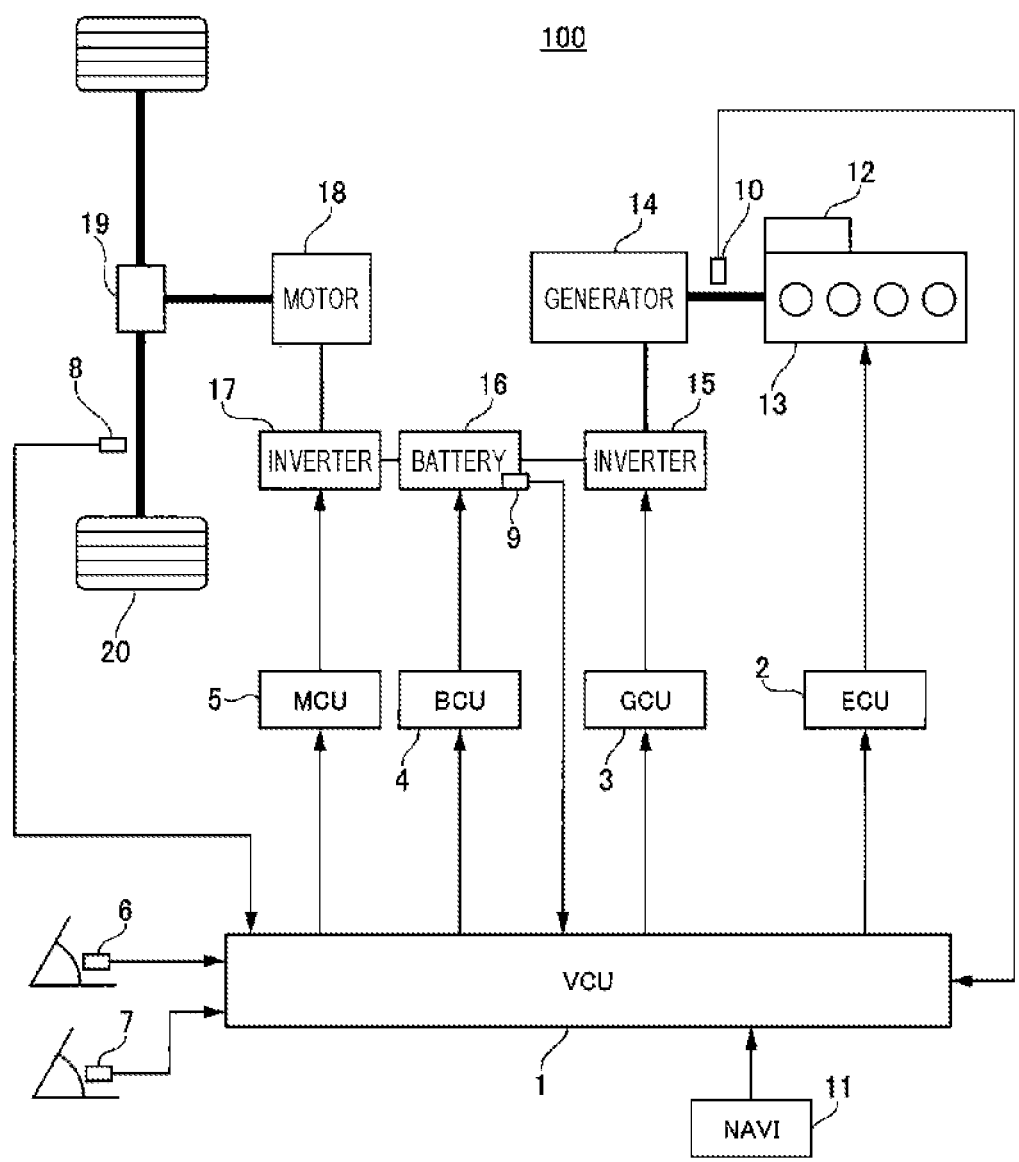
FIG. 1 is a schematic configuration diagram illustrating an example in which a control device mounted on a hybrid vehicle according to a first embodiment of the invention is applied to a series hybrid vehicle.

Hereinafter, embodiments of the invention will be described with reference to the drawings. In the present specification and the drawings, components having substantially the same function or configuration are denoted by the same reference numerals, and the redundant description is omitted.

First Embodiment

FIG. 1 is a schematic configuration diagram illustrating an example in which a control device mounted on a hybrid vehicle according to a first embodiment of the invention is applied to a series hybrid vehicle.

A navigation device 11 can receive GPS signals transmitted from a plurality of global positioning system (GPS) satellites above the hybrid vehicle 100 including an internal combustion engine (engine 13) as a drive source on a satellite radio wave, measure a current position, and display the current position of a hybrid vehicle 100 by superimposing the current position on a map displayed on a display device in the hybrid vehicle 100. For positioning of the current position by the navigation device 11, a base station of a mobile phone terminal, an access point of Wi-Fi (registered trademark), or the like may also be used in combination. Information on the current position of the hybrid vehicle 100 measured by the navigation device 11 and map information including the periphery where the hybrid vehicle 100 travels and the route to the destination are output to a vehicle control device, that is, a vehicle control unit (VCU) 1.

An accelerator opening sensor 6 and a brake switch 7 are provided in a cabin of the hybrid vehicle 100. The accelerator opening sensor 6 detects a depression amount of an accelerator pedal, that is, an accelerator opening. The brake switch 7 detects whether the brake pedal is depressed.

The engine 13 is a four-cylinder gasoline engine for a vehicle using spark ignition type combustion, and is an example of an internal combustion engine. The engine 13 includes a starter 12 for starting the engine 13. A crankshaft of the engine 13 is provided with a crank angle sensor 10 for detecting a rotation angle thereof, and the other end of the crankshaft is connected to a generator 14.

A generator control device, that is, a generator control unit (GCU) 3 controls driving of the generator 14 via an inverter 15 so that the inverter 15 can charge a battery 16 with a predetermined voltage. The generator 14 is driven by the engine 13 to generate power, and charges the battery 16 via the inverter 15.

A battery control device, that is, a battery control unit (BCU) 4 controls charging and discharging of the battery 16 on the basis of a battery request output from the VCU 1. The battery 16 is provided with a battery voltage sensor 9 that measures the internal voltage of the battery 16, and the VCU 1 constantly checks the voltage of the battery 16.

A motor control device, that is, a motor control unit (MCU) 5 controls an inverter 17 (and a motor 18) based on a motor request output from the VCU 1. Power is supplied to the inverter 17 from the battery 16 that is electrically connected. Then, the inverter 17 converts DC power discharged from the battery 16 into AC power and supplies the AC power to the motor 18. The motor 18 is connected to a wheel 20 via a deceleration gear 19. A vehicle speed sensor 8 is provided on a drive shaft of the wheel 20.

Each signal output from the vehicle speed sensor 8, the battery voltage sensor 9, and the crank angle sensor 10 is sent to the VCU 1. Signals output from the accelerator opening sensor 6 and the brake switch 7 are also sent to the VCU 1.

The VCU 1 is mounted on a vehicle (hybrid vehicle 100) that travels by an output of at least one of an internal combustion engine (engine 13) and an electric drive unit (motor 18). The VCU 1 calculates a required torque of the driver based on the output signal of the accelerator opening sensor 6. That is, the accelerator opening sensor 6 is used as a required torque detection sensor that detects the required torque to the engine 13 and the motor 18. Further, the VCU 1 determines the presence or absence of a deceleration request of the driver based on the output signal of the brake switch 7. In addition, the VCU 1 calculates the remaining power amount of the battery 16 based on the output signal of the battery voltage sensor 9. Further, the VCU 1 calculates the rotation speed of the engine 13 based on the output signal of the crank angle sensor 10. Then, the VCU 1 calculates the optimum operation amount of each device such as the engine request output, the motor request output, and the battery request output based on the driver request obtained from the outputs of the various sensors and the driving state of the hybrid vehicle 100.

The engine request output calculated by the VCU 1 is sent to an engine control device, that is, an engine control unit (ECU) 2. The ECU 2 controls the engine 13 based on the request output from the VCU 1. Specifically, the ECU 2 controls the starter 12 in addition to a fuel injection unit, an ignition unit, and a throttle valve (not illustrated). The motor request output calculated by the VCU 1 is transmitted to the MCU 5. The battery request output calculated by the VCU 1 is transmitted to the BCU 4.

Figure 2:
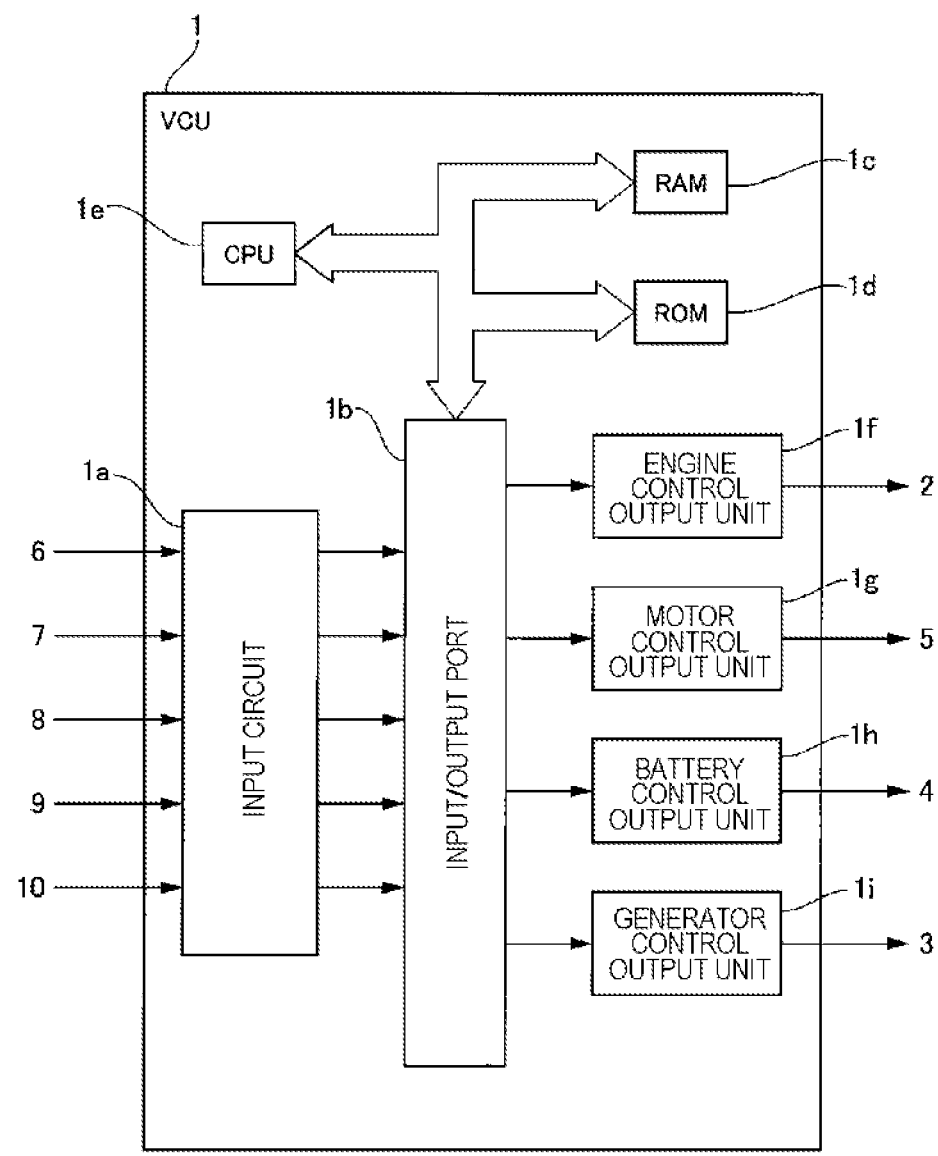
FIG. 2 is a block diagram illustrating a hardware configuration example of a VCU according to the first embodiment of the invention.

Next, an internal configuration of the VCU 1 in the first embodiment will be described. FIG. 2 is a block diagram illustrating a hardware configuration example of the VCU 1.

Each output signal output from the accelerator opening sensor 6, the brake switch 7, the vehicle speed sensor 8, the battery voltage sensor 9, and the crank angle sensor 10 is input to an input circuit $1a$ of the VCU 1. However, the input signal is not limited thereto. An input signal of each sensor input to the input circuit $1a$ is sent to an input port (not illustrated) in an input/output port $1b$. The value sent to the input port is stored in a RAM 1c, and is processed by the CPU 1e. A control program describing the contents of the arithmetic processing is written in advance in a ROM 1d.

The value indicating the operation amount of the control target (engine 13, generator 14, battery 16, motor 18, and the like) calculated according to the control program is stored in the RAM 1c, and then sent to an output port (not illustrated) in the input/output port 1b, and sent to each device via each output unit. Here, examples of the output unit include an engine control output unit 1f, a motor control output unit 1g, a battery control output unit 1h, and a generator control output unit 1i. The circuits of these output units are connected to the ECU 2, the MCU 5, the BCU 4, and the GCU 3. In FIG. 2, the control device (ECU 2, MCU 5, BCU 4, and GCU 3) to be controlled is provided separately from the VCU 1, but the invention is not limited to this mode, and a functional unit corresponding to the control device of each device may be provided in the VCU 1.

Figure 3:
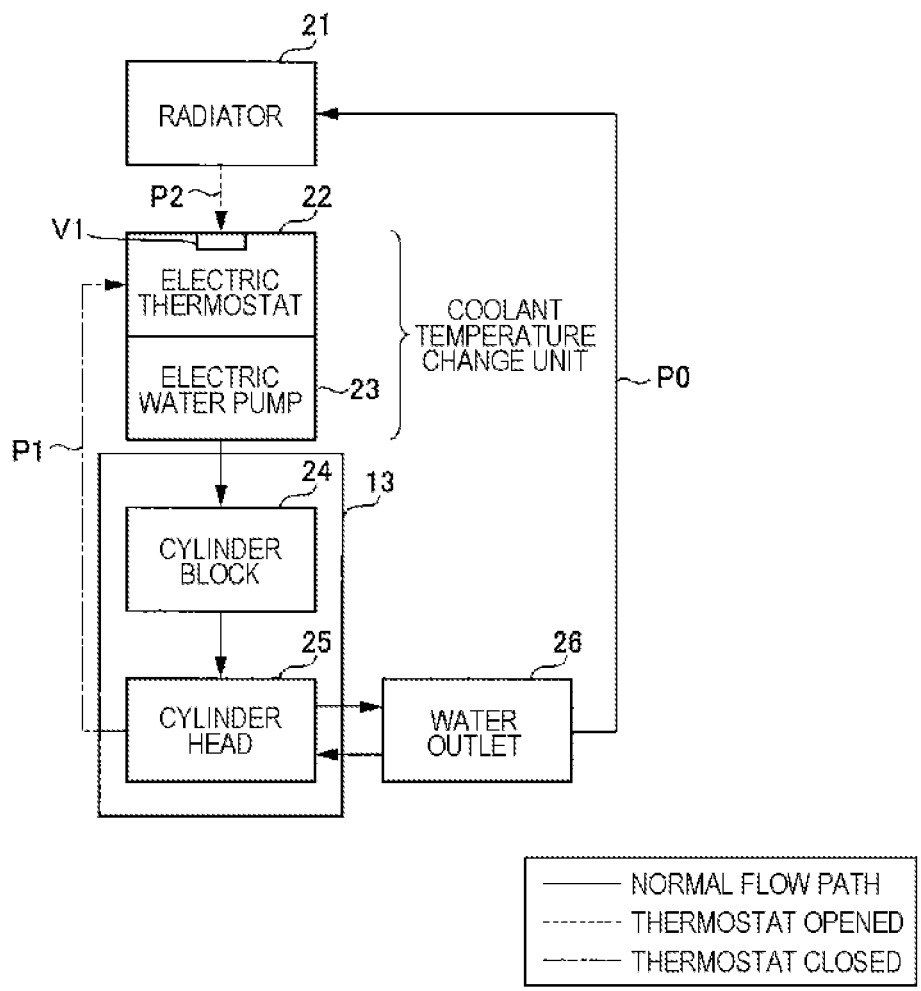
FIG. 3 is a system diagram illustrating a flow path of a coolant in a cooling system including an electric thermostat according to the first embodiment of the invention.

FIG. 3 is a system diagram illustrating a flow path of a coolant in a cooling system including an electric thermostat 22.

A flow path through which a coolant for cooling a portion having a high temperature during traveling flows is provided in the hybrid vehicle 100. For example, cooling water (coolant) mixed with antifreeze is used as the coolant. The hybrid vehicle 100 according to this embodiment includes a radiator 21, an electric thermostat 22, an electric water pump 23, a cylinder block 24, a cylinder head 25, and a water outlet 26.

The radiator 21 cools the coolant by heat exchange between the coolant and the traveling air.

A coolant temperature change unit whose operation is controlled by a coolant temperature change control unit 35 illustrated in FIG. 4 to be described later includes a coolant junction unit (electric thermostat 22) and a flow rate variable unit (electric water pump 23).

Figure 5A:
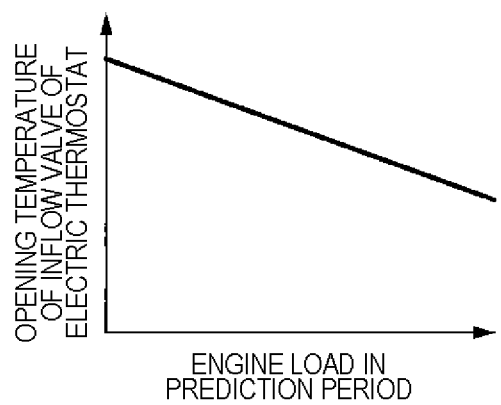
FIGS. 5A and 5B are graphs illustrating a relationship between the operation of the electric thermostat and the operation of an electric water pump with respect to an engine load in a prediction period according to the first embodiment of the invention.
Figure 5B:
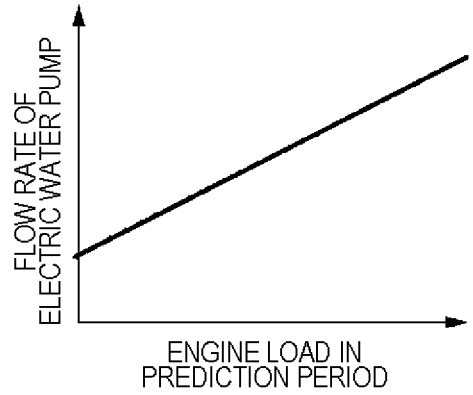

The coolant junction unit (electric thermostat 22) is provided so as to be able to take the coolant into a merging portion of a first flow path (flow path P1) through which the coolant circulates in the internal combustion engine (engine 13) and a second flow path (flow path P2) through which the coolant circulates in the internal combustion engine (engine 13) and the radiator (radiator 21), opens a valve (inflow valve V1) so that the coolant can flow in from the second flow path (flow path P2) according to the temperature of the coolant, and merges and takes the coolant. For example, the electric thermostat 22 includes the inflow valve V1 that is connected to the flow path P2 and into which the coolant flows from the radiator 21. The coolant having flowed into the inflow valve V1 flows out to the electric water pump 23. The electric thermostat 22 has a fail-safe function of opening the inflow valve V1 to lower the temperature of the coolant when the temperature of the coolant exceeds a predetermined temperature (for example, a specific temperature of 60 degrees to 100 degrees). As illustrated in FIG. 5 to be described later, the VCU 1 changes the valve opening temperature for opening the inflow valve V1 of the electric thermostat 22 according to the load of the engine 13 to control the operation of the electric thermostat 22.

The flow rate variable unit (electric water pump 23) varies the flow rate of the coolant taken into the coolant junction unit (electric thermostat 22), and circulates the coolant in the first flow path (flow path P1) or the second flow path (flow path P2). The electric water pump 23 is driven and controlled by the VCU 1, and when the predicted engine output of the engine 13 increases, the electric water pump cools the engine 13 by causing the coolant to flow through the flow paths P0 and P2 such that the coolant circulates between the radiator 21 and the engine 13. On the other hand, when the predicted engine output of the engine 13 decreases, the electric water pump 23 prevents the coolant from flowing to the radiator 21, so that the coolant flows to the flow path P1 to suppress cooling of the engine 13. Note that the electric water pump 23 can be driven by electric power supplied from the battery 16 even when the hybrid vehicle 100 is stopped.

The cylinder block 24 stores a cylinder including a piston and a connecting rod provided in the engine 13, and a crank case housing a crankshaft.

The cylinder head 25 is attached to an upper portion of the cylinder block 24, and includes a cam shaft, an intake/exhaust valve, a combustion chamber, and the like. In the following description, the cylinder block 24 and the cylinder head 25 may be collectively referred to as an engine 13.

The water outlet 26 is provided between the cylinder head 25 and the radiator 21, and causes the coolant flowing from the cylinder head 25 to flow out to the radiator 21. In addition, the coolant may be returned from the water outlet 26 to the cylinder head 25.

In the drawing, the normal flow path P0 of the coolant is represented by a solid line, the flow path P2 when the inflow valve V1 of the electric thermostat 22 is opened is represented by a broken line, and the flow path P1 when the inflow valve V1 is closed is represented by a broken line. In the normal flow path P0, the coolant is accumulated between the water pump 23 and the radiator 21. The coolant in the normal flow path P0 remains accumulated unless the inflow valve V1 is opened and the coolant flows from the flow path P2. Then, the coolant circulates in the flow path P1 without flowing toward the radiator 21.

For example, when the hybrid vehicle 100 is traveling at high speed, the cylinder block 24 and the cylinder head 25 have high heat, so that the inflow valve V1 is opened. When the inflow valve V1 is opened, the coolant flows through the flow paths P0 and P2 in the order of the cylinder block 24, the cylinder head 25, the water outlet 26, and the radiator 21 by the electric water pump 23, circulates again in the electric thermostat 22, and flows into the electric water pump 23. Therefore, the coolant that has taken heat from the cylinder block 24 and the cylinder head 25 is efficiently cooled by the radiator 21.

When the hybrid vehicle 100 is idling stop or traveling at a low speed, the inflow valve V1 is closed because the heat generation of the cylinder block 24 and the cylinder head 25 is small. When the inflow valve V1 is closed, the coolant flows through the flow path P1 bypassing the radiator 21. That is, the coolant flows through the flow path P1 in the order of the cylinder block 24 and the cylinder head 25 by the electric water pump 23, circulates again in the electric thermostat 22, and flows into the electric water pump 23. Therefore, the coolant is not excessively cooled by the radiator 21.

Figure 4:
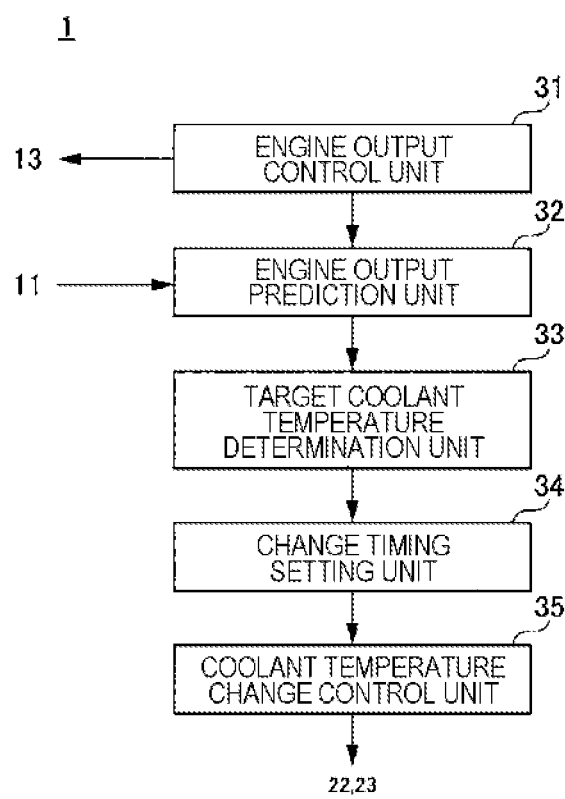
FIG. 4 is a block diagram illustrating a functional configuration example of the VCU according to the first embodiment of the invention.

FIG. 4 is a block diagram illustrating a functional configuration example of the VCU 1 according to the first embodiment.

The VCU 1 includes an engine output control unit 31, an engine output prediction unit 32, a target coolant temperature determination unit 33, a change timing setting unit 34, and a coolant temperature change control unit 35.

An internal combustion engine output control unit (engine output control unit 31) outputs internal combustion engine control information (engine control information) for controlling the output of the internal combustion engine (engine 13) to the internal combustion engine (engine 13). Engine control information of the engine 13 controlled by the engine output control unit 31 is input to the engine output prediction unit 32.

An internal combustion engine output prediction unit (engine output prediction unit 32) predicts an output of an internal combustion engine (engine 13) in a future prediction period on the basis of position information of a vehicle (hybrid vehicle 100) acquired from a positioning unit (navigation device 11) that measures a position (current position) of the vehicle (hybrid vehicle 100), traffic information related to a route to a destination, and internal combustion engine control information (engine control information). The output of the internal combustion engine (engine 13) changes depending on the load of the internal combustion engine (engine 13) in the prediction period. Here, the internal combustion engine output prediction unit (engine output prediction unit 32) predicts the output of the internal combustion engine (engine 13) in the prediction period based on the vehicle speed of the vehicle (hybrid vehicle 100). For example, the vehicle speed when the vehicle (hybrid vehicle 100) travels on an expressway is a value higher than that when the vehicle (hybrid vehicle 100) travels in an urban area. Then, the internal combustion engine output prediction unit (engine output prediction unit 32) predicts the maximum value of the output of the internal combustion engine (engine 13) in the prediction period as the output of the internal combustion engine (engine 13).

A target coolant temperature determination unit (target coolant temperature determination unit 33) determines a target coolant temperature that is a target temperature of a coolant for cooling the internal combustion engine (engine 13) based on the predicted output of the internal combustion engine (engine 13). Here, the target coolant temperature determination unit (target coolant temperature determination unit 33) determines the target coolant temperature to be higher as the predicted output of the internal combustion engine (engine 13) is lower, and determines the target coolant temperature to be lower as the predicted output of the internal combustion engine (engine 13) is higher.

A change timing setting unit (change timing setting unit 34) sets a change timing for changing the temperature of the coolant to the target coolant temperature based on the predicted output of the internal combustion engine (engine 13). Here, the change timing setting unit (change timing setting unit 34) sets, as the change timing, a timing at which the predicted output of the internal combustion engine (engine 13) switches from low output to high output or a timing at which the predicted output of the internal combustion engine (engine 13) switches from high output to low output.

A coolant temperature change control unit (coolant temperature change control unit 35) controls the operation of the coolant temperature change unit (the electric thermostat 22 and the electric water pump 23) that changes the temperature of the coolant at the change timing so that the coolant temperature becomes the target coolant temperature based on the predicted output of the internal combustion engine (the engine 13).

Note that the internal combustion engine output prediction unit (engine output prediction unit 32) may predict the average value of the output of the internal combustion engine (engine 13) in the prediction period as the output of the internal combustion engine (engine 13). In this case, the target coolant temperature determination unit (target coolant temperature determination unit 33) determines the target coolant temperature to be high when the average value is equal to or less than the set average value, and determines the target coolant temperature to be low when the average value exceeds the set average value.

FIG. 5 is a graph illustrating a relationship between the operation of the electric thermostat 22 and the operation of the electric water pump 23 with respect to the engine load in the prediction period.

The coolant temperature change control unit (coolant temperature change control unit 35) operates the coolant junction unit (electric thermostat 22) at a higher coolant temperature as the predicted output of the internal combustion engine (engine 13) is lower to circulate the coolant to the first flow path (flow path P1) and reduce the flow rate of the coolant flowing out from the flow rate variable unit (electric water pump 23), or operates the coolant junction unit (electric thermostat 22) at a lower coolant temperature as the predicted output of the internal combustion engine (engine 13) is higher to circulate the coolant to the second flow path (flow path P2) and increase the flow rate of the coolant flowing out from the flow rate variable unit (electric water pump 23).

In the graph (1) of FIG. 5, the horizontal axis represents the engine load in the prediction period, and the vertical axis represents the opening temperature at which the inflow valve V1 of the electric thermostat 22 opens. For example, when the engine load in the prediction period, that is, the engine output of the engine 13 is low, the opening temperature of the inflow valve V1 is high. Therefore, as illustrated in the flow path P1 in FIG. 3, the coolant does not flow to the radiator 21. However, as the engine load increases, the opening temperature of the inflow valve V1 decreases. That is, at a high engine load, the inflow valve V1 is opened, and the coolant flowing through the radiator 21 is sufficiently cooled and circulated as illustrated in the flow path P2 of FIG. 3.

In the graph (2) of FIG. 5, the horizontal axis represents the engine load in the prediction period, and the vertical axis represents the flow rate of the electric water pump 23. When the engine load in the prediction period, that is, the engine output of the engine 13 is low, the coolant flows only through the flow path P1 illustrated in FIG. 3. Therefore, the flow rate of the electric water pump 23 is small, and the flow rate of the coolant circulating through the flow path P1 is small. However, as the engine load increases, the inflow valve V1 of the electric thermostat 22 opens, and the coolant flows through the flow path P2 in addition to the flow path P1, so that the flow rate of the electric water pump 23 increases. That is, at a high engine load, the flow rate of the electric water pump 23 increases, and the flow rate of the coolant flowing through the flow path P2 also increases, so that the flow rate of the coolant cooled by the radiator 21 increases. Therefore, the coolant can sufficiently cool the engine 13 including the cylinder block 24 and the cylinder head 25.

Figure 6:
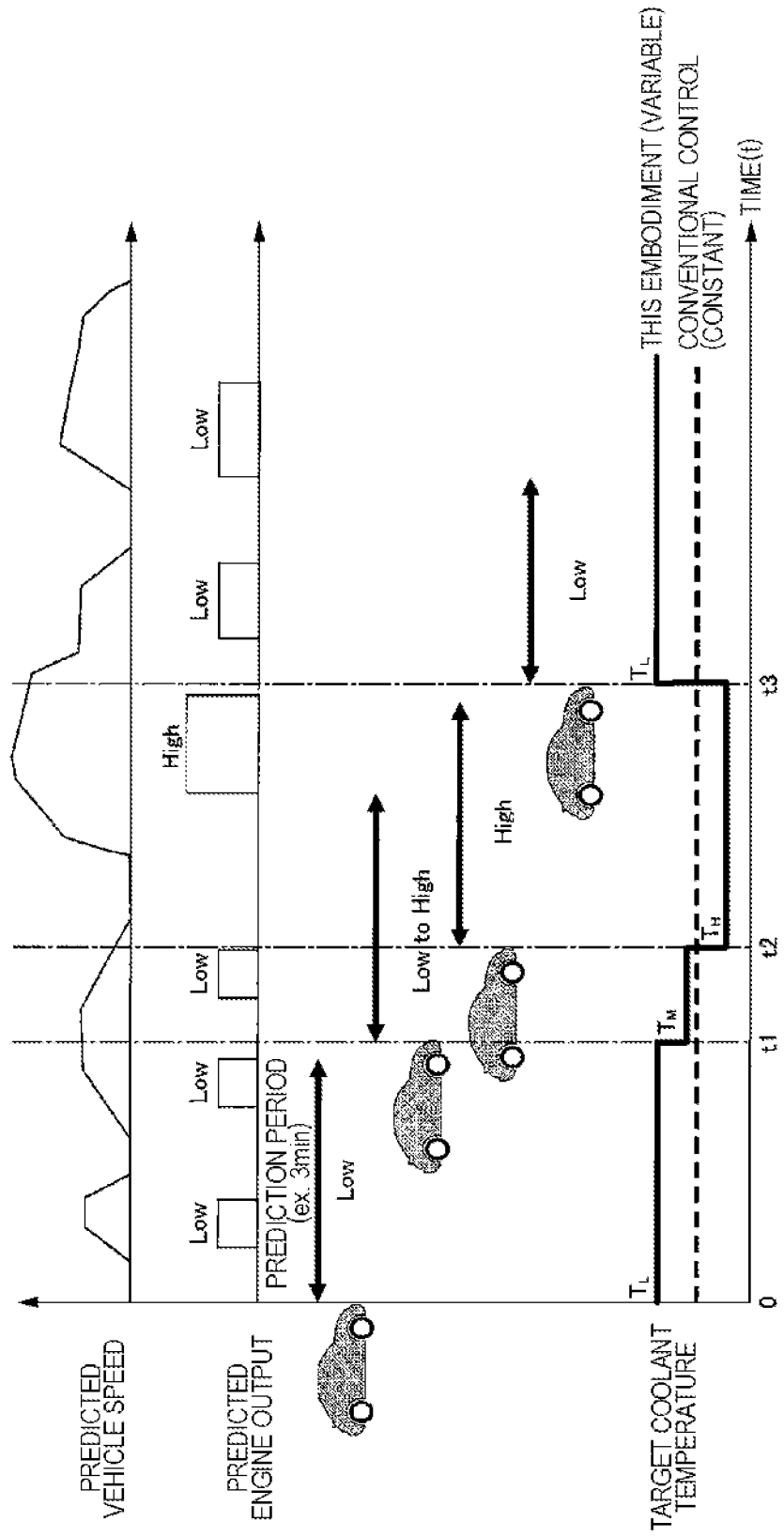
FIG. 6 is an explanatory diagram illustrating an example of a target coolant temperature determined based on a predicted vehicle speed and a predicted engine output according to the first embodiment of the invention.

FIG. 6 is an explanatory diagram illustrating an example of a target coolant temperature determined based on a predicted vehicle speed and a predicted engine output. Here, the future prediction period starting from the present is, for example, 3 minutes.

($t=0\sim t1$)

When the stopped hybrid vehicle 100 starts traveling, the predicted vehicle speed increases. For example, when the hybrid vehicle 100 travels in an urban area, acceleration, deceleration, and stop of the hybrid vehicle 100 frequently occur, and generation or stop of low predicted engine output is repeated.

In urban areas, there are many periods during which the predicted engine output does not occur, so the target coolant temperature is substantially constant at $T_L$. At this time, the inflow valve V1 is closed, and the coolant flows through the flow path P1 not passing through the radiator 21. Note that $T_L$ representing the target coolant temperature is a value corresponding to Low of the predicted engine output.

(t=t1~t2)

When the output of the hybrid vehicle 100 changes from Low to High, the period in which the predicted engine output is generated increases even if the predicted engine output is low, and the heat generation of the engine 13 tends to be high. Therefore, the target coolant temperature is changed to $T_M$ lower than $T_L$. At this time, the inflow valve V1 is opened, and the coolant flows through the flow paths P0 and P2 via the radiator 21. However, the flow rate per unit time of the coolant flowing toward the radiator 21 is controlled to be smaller by the electric water pump 23. The $T_M$ representing the target coolant temperature is a value corresponding to Medium (Low to High in the drawing) of the predicted engine output.

(t=t2~t3)

When the hybrid vehicle 100 travels on an expressway, a high engine output is required, and thus the predicted engine output also increases. In addition, since high predicted engine output continues for a long period of time, the engine 13 tends to have a high temperature. In order to sufficiently cool the engine 13, the target coolant temperature is changed to $T_H$ lower than $T_M$. Further, the flow rate per unit time of the coolant flowing toward the radiator 21 is controlled to be larger by the electric water pump 23. At this time, the coolant flows through the flow paths P0 and P2 via the radiator 21, whereby the coolant is sufficiently cooled. Note that $T_H$ representing the target coolant temperature is a value corresponding to High of the predicted engine output.

(After t=t3)

When the hybrid vehicle 100 travels in an urban area or the like again, the predicted engine output decreases. Therefore, the heat generation of the engine 13 also decreases, and the target coolant temperature is also changed to the high $T_L$. At this time, the inflow valve V1 is closed, and the coolant flows through the flow path P1 not passing through the radiator 21.

As shown in the drawing, since the target coolant temperature is conventionally constant, for example, when the target coolant temperature in the period after t=0 to t1, and t3 is low, the coolant is excessively cooled. In addition, since the engine output increases in the period of t=t2 to t3, the target coolant temperature remains high although the coolant needs to be sufficiently cooled. Therefore, the coolant cannot sufficiently cool the engine 13.

On the other hand, in the control of the VCU 1 according to this embodiment, the target coolant temperature is variable. Then, a change in the traveling condition of the hybrid vehicle 100 is obtained on the basis of the position information of the hybrid vehicle 100 input from the navigation device 11, the traffic information related to the route to the destination, and the engine control information, and an appropriate engine output according to the traveling condition is predicted.

Then, the change timing setting unit 34 can set each time of t=t1, t2, and t3 illustrated in FIG. 6 as the change timing. Then, the coolant temperature change control unit 35 performs control to change the temperature of the coolant at the set change timing. Therefore, the engine 13 is efficiently cooled, and the practical fuel consumption of the hybrid vehicle 100 can be reduced.

In the VCU 1 according to the first embodiment described above, the target coolant temperature is determined on the basis of the predicted engine output, and the coolant is cooled or heated so that the coolant temperature reaches the target coolant temperature. Since the target coolant temperature is variable in accordance with the predicted engine output, the coolant temperature is also variable. As a result, when the predicted engine output is low, the coolant having a high coolant temperature circulates through the flow path, and the cooling loss of the engine 13 can be reduced. In addition, when the predicted engine output is high, the coolant having a low coolant temperature circulates through the flow path, and knocking of the engine 13 can be suppressed. In either case, the fuel efficiency of the hybrid vehicle 100 can be improved by the control of the VCU 1.

Second Embodiment

Next, a configuration example and an operation example of the VCU according to a second embodiment of the invention will be described with reference to FIG. 7.

It takes time to cool the coolant to the target coolant temperature. Therefore, for example, if the engine output prediction unit 32 can predict in advance that a high load is applied to the engine 13 of the hybrid vehicle 100, it is desirable to start cooling the coolant before the high load is actually applied to the engine 13.

Therefore, the change timing setting unit 34 sets the change timing for cooling the coolant to the coolant temperature determined by the target coolant temperature determination unit 33. The change timing to be set is before a high load is actually applied to the engine 13.

Thereafter, the coolant temperature change control unit 35 performs control to change the coolant temperature at the set change timing. At this time, in the coolant temperature change control unit 35, the coolant temperature change control unit 35 controls the operations of the electric thermostat 22 and the electric water pump 23 such that the coolant reaches the target coolant temperature.

Figure 7:
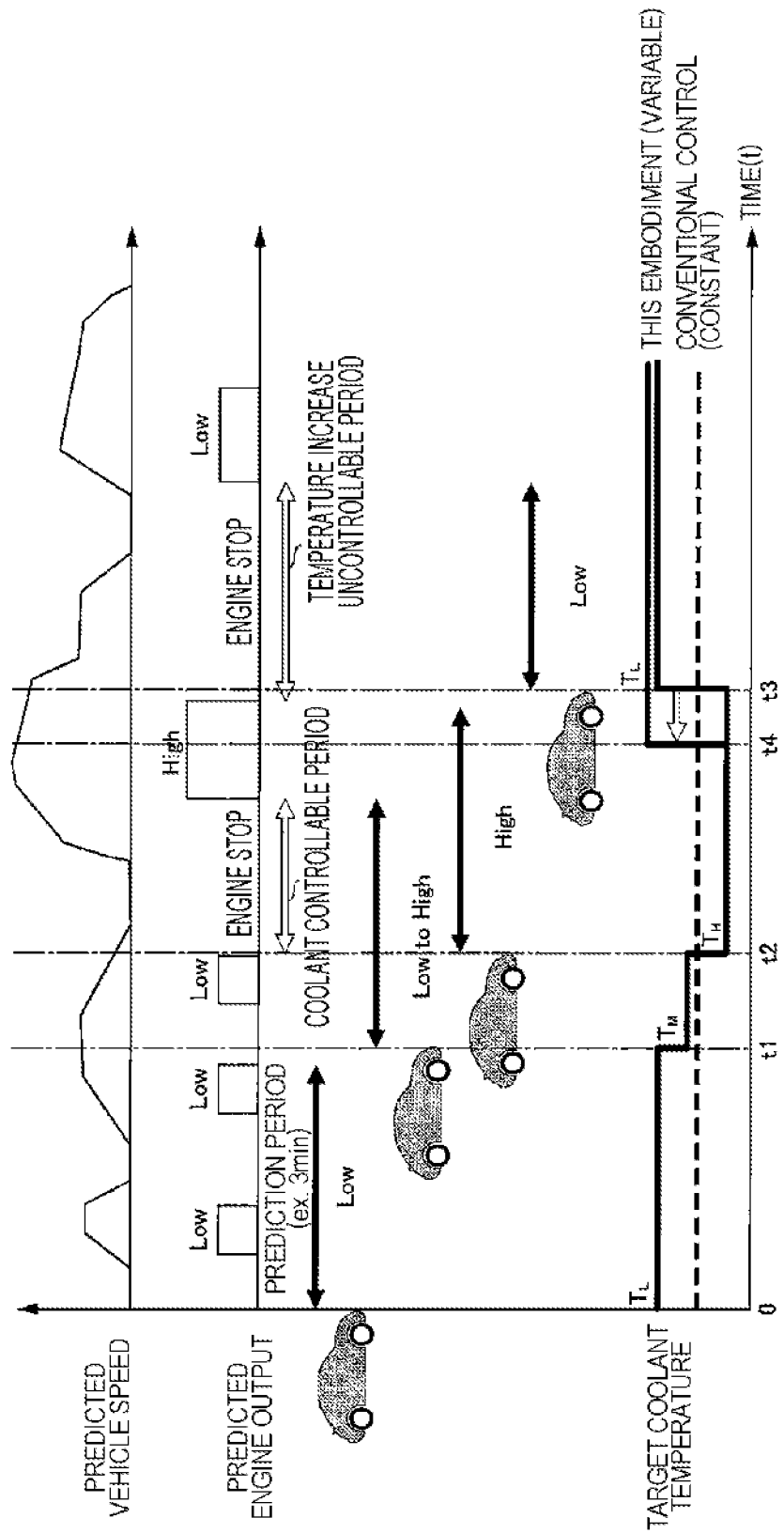
FIG. 7 is an explanatory diagram illustrating an example of a target coolant temperature determined based on a predicted vehicle speed and a predicted engine output according to a second embodiment of the invention.
Figure 8A:
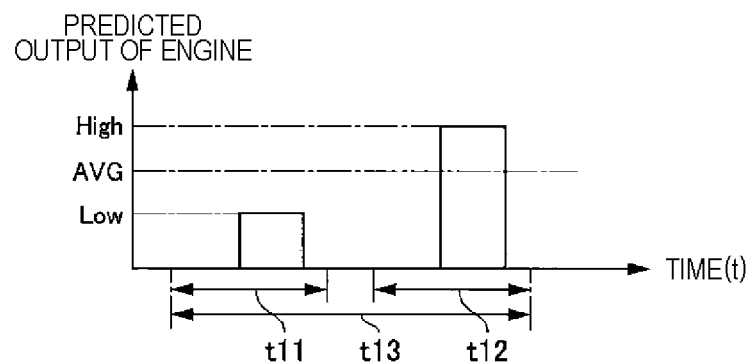
FIGS. 8A-8D are graphs illustrating a relationship between a predicted engine output and a target coolant temperature in a prediction period according to a third embodiment of the invention.
Figure 8B:
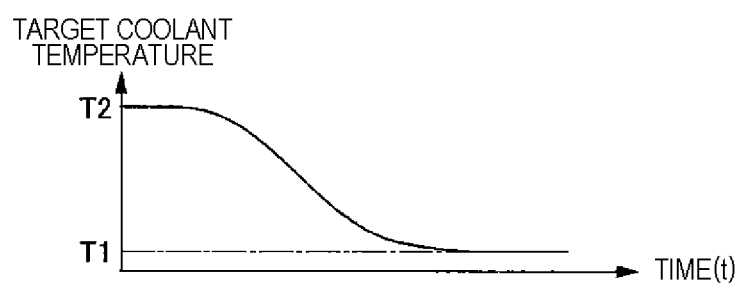
Figure 8C:
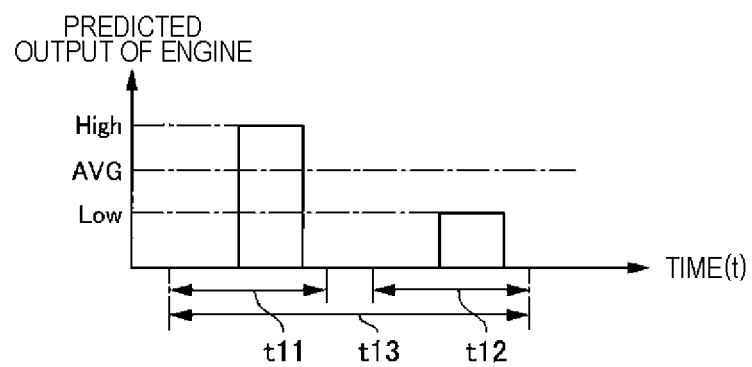
Figure 8D:
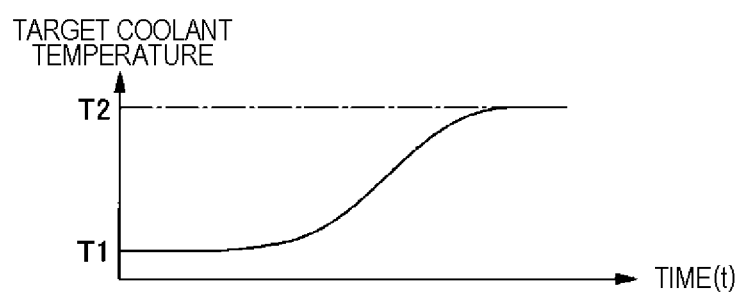

FIG. 7 is an explanatory diagram illustrating an example of a target coolant temperature determined based on a predicted vehicle speed and a predicted engine output. The changes in the predicted vehicle speed, the predicted engine output, and the target coolant temperature in FIG. 7 are similar to the changes in the respective pieces of information illustrated in FIG. 6, and thus different points will be described.

In this embodiment, the engine 13 is stopped in a specific period between t=t2 and t3. At this time, since the VCU 1 can cool the coolant, a period during which the engine 13 is stopped in which the target coolant temperature is set to be low is referred to as a cooling controllable period. Then, the engine operates before t=t3, and the predicted engine output increases.

On the other hand, in a specific period after t=t3, the engine 13 may be stopped although the target coolant temperature needs to be maintained high. In this case, since the VCU 1 cannot raise the temperature of the coolant, a period during which the engine 13 is stopped in which the target coolant temperature is set high is referred to as a temperature rise uncontrollable period. Therefore, when the internal combustion engine output prediction unit (engine output prediction unit 32) predicts that the time during which the internal combustion engine (engine 13) stops is equal to or longer than the set time after the output of the internal combustion engine (engine 13) is switched from the high output to the low output, the change timing setting unit (change timing setting unit 34) sets, as the change timing, the timing earlier than the timing at which the output of the internal combustion engine (engine 13) is switched from the high output to the low output.

For example, in a case where the hybrid vehicle 100 travels in an urban area or the like after t=t3, if the engine 13 stops for a set time or more, the engine output decreases. Therefore, the change timing setting unit 34 performs setting to advance the change timing from t3 to t4 so that the coolant temperature changes quickly to the target coolant temperature $T_L$ determined by the target coolant temperature determination unit 33. Therefore, the coolant temperature quickly changes to the target coolant temperature $T_L$, and the coolant temperature can be kept high when the engine output decreases after t3. As a result, the engine 13 can be efficiently cooled.

In the VCU 1 according to the second embodiment described above, when it is predicted that the coolant temperature cannot be raised to the target coolant temperature due to stop of the engine 13 for a set time or more, control is performed such that the timing of raising the coolant temperature is advanced from before the engine 13 is stopped. Since the coolant temperature is raised before the engine 13 is stopped, the coolant temperature becomes the target coolant temperature even in the temperature rise uncontrollable period. Therefore, even if the predicted engine output is low in the temperature rise uncontrollable period, the coolant having a high coolant temperature can be circulated to the engine 13.

Third Embodiment

Next, a control example of the VCU according to a third embodiment of the invention will be described with reference to FIG. 8.

It takes, for example, several minutes for the coolant temperature to reach the target coolant temperature. For this reason, the target coolant temperature determined by the VCU based on the average value of the predicted engine output in the future prediction period starting from the present time may not be appropriate. In this embodiment, a control example of the VCU that performs processing for determining an appropriate target coolant temperature will be described.

FIG. 8 is a graph illustrating a relationship between a predicted engine output and a target coolant temperature in a prediction period. In the graphs (1) and (3) of FIG. 8, the horizontal axis represents time t, and the vertical axis represents the predicted engine output. In the graphs (2) and (4) of FIG. 8, the horizontal axis represents time t, and the vertical axis represents the target coolant temperature.

If the engine output prediction unit 32 of the VCU 1 extends the period for obtaining the predicted engine output, an incorrect target coolant temperature may be determined due to an inappropriate predicted engine output. For example, as illustrated in the graph (1) of FIG. 8, the predicted engine output may be low at first, and then the predicted engine output may be high, or as illustrated in the graph (3) of FIG. 8, the predicted engine output may be high at first, and then the predicted engine output may be low. Here, the predicted engine output obtained in the long period t13 by the engine output prediction unit 32 has the same AVG value in both of the graphs (1) and (3) of FIG. 8. Therefore, the VCU 1 does not know how to change the target coolant temperature.

Therefore, the internal combustion engine output prediction unit (engine output prediction unit 32) predicts, as the output of the internal combustion engine (engine 13), an average value of the output of the internal combustion engine (engine 13) obtained every time shorter than the time required for the coolant temperature to change to the target coolant temperature. For example, the engine output prediction unit 32 sets the period for obtaining the predicted engine output to be shorter than t13. In the graph (1) of FIG. 8, it is assumed that the engine output prediction unit 32 first predicts the predicted engine output in the period t11 as Low, and predicts the predicted engine output in the period t12 after the period t11 elapses as High. In this case, as illustrated in the graph (2) of FIG. 8, the target coolant temperature determination unit 33 determines the high target coolant temperature T2 since the predicted engine output is low in the period t11, and determines the low target coolant temperature T1 since the predicted engine output is high in the period t12. Since the coolant is heated or cooled by the target coolant temperatures T1 and T2 determined in this manner, the coolant suitable for the predicted engine output can be circulated to the engine 13.

In addition, in the graph (3) of FIG. 8, it is assumed that the engine output prediction unit 32 first predicts the predicted engine output in the period t11 as High and predicts the predicted engine output in the period t12 after the period t11 elapses as Low. In this case, as illustrated in the graph (4) of FIG. 8, the target coolant temperature determination unit 33 determines the low target coolant temperature T1 since the predicted engine output is high in the period t11, and determines the high target coolant temperature T2 since the predicted engine output is low in the period t12.

In the control of the VCU 1 according to the third embodiment described above, the target coolant temperature is determined on the basis of the predicted engine output obtained in a short period. Then, the coolant is heated or cooled by the target coolant temperatures determined in this manner, the coolant suitable for the predicted engine output can be circulated to the engine 13.

Here, the period for predicting the predicted engine output may be arbitrarily set. However, if a period for the engine output prediction unit 32 to predict the predicted engine output is slightly increased, a processing load is applied to the VCU 1. Therefore, the period for predicting the predicted engine output may be, for example, about half the time required for the coolant to reach the target coolant temperature.

Fourth Embodiment

Next, a cooling system according to a fourth embodiment of the invention will be described with reference to FIGS. 9 and 10. In the cooling systems according to the first to third embodiments, it has been described that the electric thermostat illustrated in FIG. 5 is configured. However, a coolant control valve (MCV: Multi water-way Control Valve) that changes the flow rate of the coolant may be provided instead of the electric thermostat 22. In each of the following embodiments, the VCU 1 according to the first embodiment can be applied.

Figure 9:
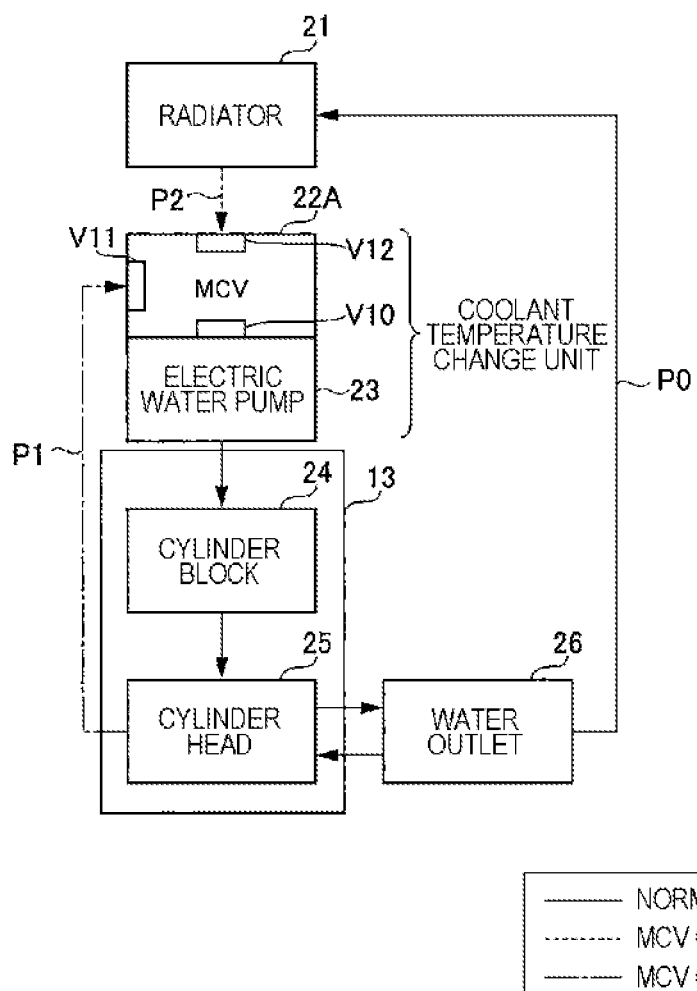
FIG. 9 is a system diagram illustrating a flow path of a coolant in a cooling system including an MCV according to a fourth embodiment of the invention.

FIG. 9 is a system diagram illustrating a flow path of a coolant in a cooling system including an MCV 22A.

The coolant temperature change unit whose operation is controlled by the coolant temperature change control unit 35 according to the fourth embodiment includes a coolant junction unit (MCV 22A) and a flow rate variable unit (electric water pump 23).

The coolant junction unit (MCV 22A) is provided so as to be able to take the coolant into a merging portion of a first flow path (flow path P1) through which the coolant circulates in the internal combustion engine (engine 13) and a second flow path (flow path P2) through which the coolant circulates in the internal combustion engine (engine 13) and the radiator (radiator 21), opens a valve (inflow valves V11 and V12) so that the coolant can flow in from at least any of the first flow path (flow path P1) and the second flow path (flow path P2), and merges and takes the coolant.

The flow rate variable unit (electric water pump 23) varies the flow rate of the coolant taken into the coolant junction unit (MCV 22A), and circulates the coolant in at least any of the first flow path (flow path P1) and the second flow path (flow path P2).

For example, the MCV 22A includes two inflow valves V11 and V12 into which the coolant flows from the cylinder head 25 and the radiator 21, respectively, and one outflow valve V10 from which the coolant flows out to the electric water pump 23. The MCV 22A opens and closes the inflow valves V11 and V12 and the outflow valve V10 according to the control of the VCU 1. That is, the coolant temperature change control unit 35 illustrated in FIGS. 3 and 4 can change the valve opening degrees of the two inflow valves V11 and V12 by controlling the operation of the MCV 22A. When the inflow valve V12 of the MCV 22A is opened, the coolant flows through the flow paths P0 and P2. When the inflow valve V11 of the MCV 22A is opened, the coolant flows through the flow path P1.

Figure 10A:
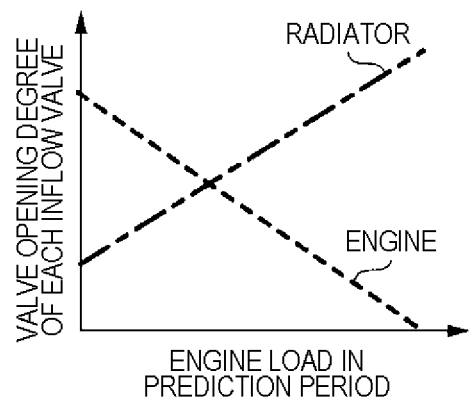
FIGS. 10A and 10B are graphs illustrating a relationship between a valve opening degree of each inflow valve of the MCV and the flow rate of the electric water pump with respect to the engine load in the prediction period according to the fourth embodiment of the invention.
Figure 10B:
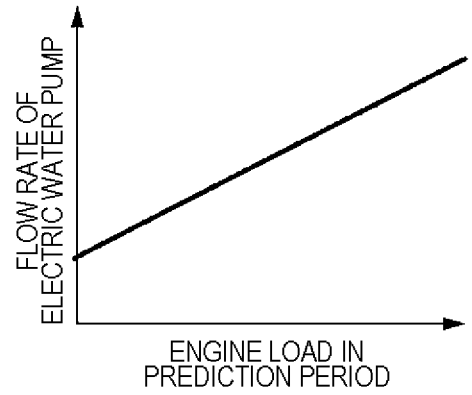

FIG. 10 is a graph illustrating a relationship between the valve opening degree of each of the inflow valves V11 and V12 of the MCV 22A and the flow rate of the electric water pump 23 with respect to the engine load in the prediction period.

The coolant temperature change control unit (coolant temperature change control unit 35) operates the coolant junction unit (MCV 22A) such that the coolant flowing in from the first flow path (flow path P1) becomes larger than the coolant flowing in from the second flow path (flow path P2) as the predicted output of the internal combustion engine (engine 13) is lower, and reduces the flow rate of the coolant flowing out from the flow rate variable unit (electric water pump 23). Alternatively, the coolant temperature change control unit (coolant temperature change control unit 35) operates the coolant junction unit (MCV 22A) such that the coolant flowing in from the first flow path (flow path P1) becomes smaller than the coolant flowing in from the second flow path (flow path P2) as the predicted output of the internal combustion engine (engine 13) is higher, and increases the flow rate of the coolant flowing out from the flow rate variable unit (electric water pump 23).

In the graph (1) of FIG. 10, the horizontal axis represents the engine load in the prediction period, and the vertical axis represents the valve opening degree of each inflow valve of the MCV 22A. When the engine load in the prediction period, that is, the engine output of the engine 13 is low, the coolant temperature change control unit 35 narrows the opening degree of the inflow valve V12 of the MCV 22A, so that the coolant flowing from the radiator 21 into the MCV 22A is small. On the other hand, in order to increase the opening degree of the inflow valve V11 into which the coolant flows from the engine 13 of the MCV 22A, that is, the cylinder head 25, the coolant temperature change control unit 35 increases the amount of the coolant flowing into the MCV 22A from the engine 13. That is, when the engine output of the engine 13 is low, the coolant is not excessively cooled.

As the engine load increases, the coolant temperature change control unit 35 widens the opening degree of the inflow valve V12 into which the coolant flows from the radiator 21, and conversely narrows the opening degree of the inflow valve V11 into which the coolant flows from the engine 13. That is, at a high engine load, the coolant flowing through the radiator 21 and passing through the MCV 22A increases, and as shown in the flow path P2 of FIG. 3, the coolant flowing through the radiator 21 is sufficiently cooled and circulated.

In the graph (2) of FIG. 10, the horizontal axis represents the engine load in the prediction period, and the vertical axis represents the flow rate of the electric water pump 23. The graph (2) of FIG. 10 is similar to the graph (2) illustrated in FIG. 5. That is, when the engine load in the prediction period, that is, the engine output of the engine 13 is low, the flow rate of the coolant circulating through the flow path P1 illustrated in FIG. 9 increases, and when the engine load is high, the flow rate of the coolant flowing through the flow path P2 increases. Therefore, the coolant can sufficiently cool the engine 13 including the cylinder block 24 and the cylinder head 25.

In the VCU 1 according to the fourth embodiment described above, the valve opening degrees of the inflow valves V11 and V12 into which the coolant flows are changed by the MCV 22A controlled by the coolant temperature change control unit 35. When the load of the engine 13 is low, the VCU 1 narrows the inflow valve V12 of the radiator 21, opens the inflow valve V11 of the engine 13, and further reduces the flow rate of the electric water pump 23, thereby easily warming the coolant. On the other hand, when the load on the engine 13 is high, the VCU 1 opens the inflow valve V12 of the radiator 21, narrows the inflow valve V11 of the engine 13, and further increases the flow rate of the electric water pump 23, so that the engine 13 can be easily cooled with the coolant.

Fifth Embodiment

Next, a cooling system according to a fifth embodiment of the invention will be described with reference to FIGS. 11 and 12. The cooling system according to this embodiment is different from the cooling system according to the fourth embodiment in that a heater capable of warming the coolant even while the engine 13 is stopped is provided.

Figure 11:
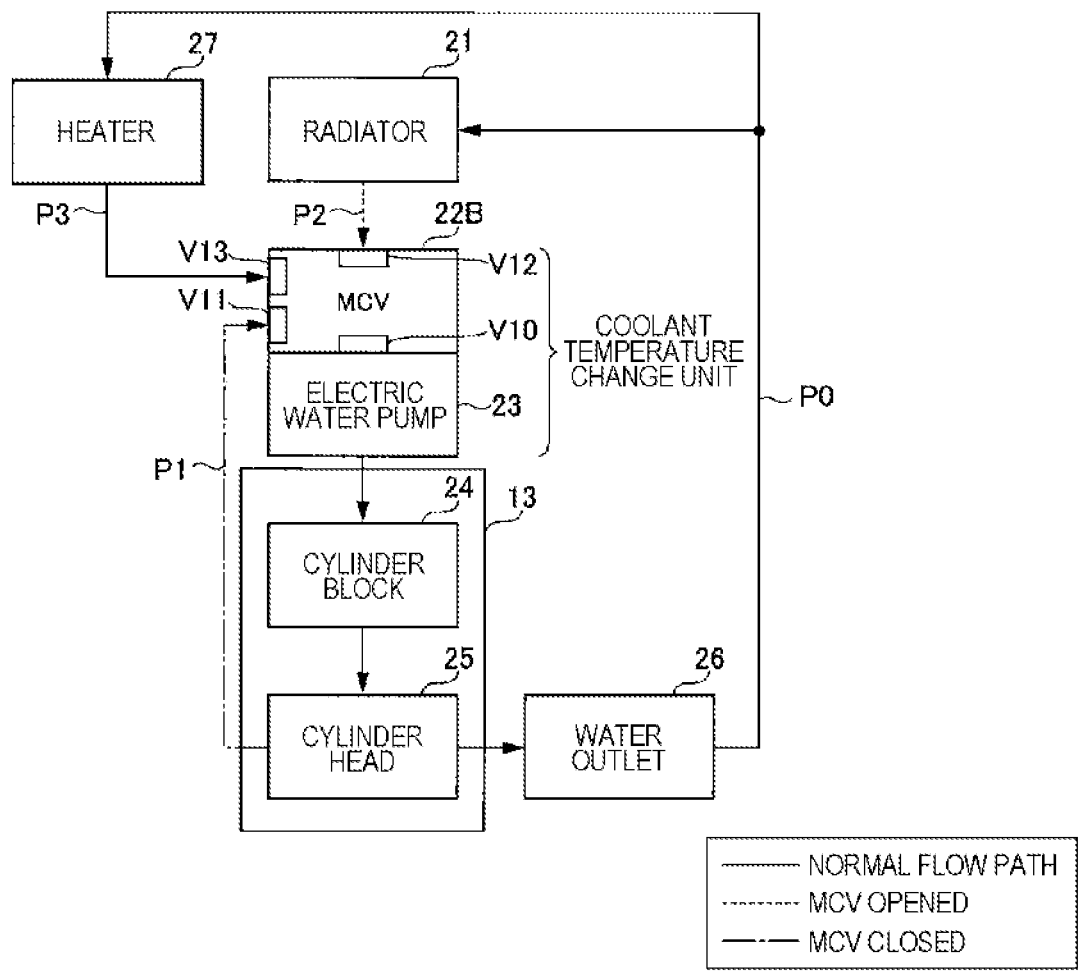
FIG. 11 is a system diagram illustrating a flow path of a coolant in a cooling system including a heater according to a fifth embodiment of the invention.

FIG. 11 is a system diagram illustrating the flow path of the coolant in the cooling system including a heater 27.

The coolant temperature change unit whose operation is controlled by the coolant temperature change control unit 35 according to the fifth embodiment includes a heater (heater 27) that warms the coolant, a coolant junction unit (MCV 22B), and a flow rate variable unit (electric water pump 23).

The heater 27 can warm the coolant flowing out of the water outlet 26.

The coolant junction unit (MCV 22B) is provided so as to be able to take the coolant into a merging portion of a first flow path (flow path P1) through which the coolant circulates in the internal combustion engine (engine 13), a second flow path (flow path P2) through which the coolant circulates in the internal combustion engine (engine 13) and the radiator (radiator 21), and a third flow path (flow path P3) through which the coolant circulates in the heater (heater 27), opens a valve (inflow valves V11, V12, and V13) so that the coolant can flow in from at least any of the first flow path (flow path P1), the second flow path (flow path P2), and the third flow path (flow path P3), and merges and takes the coolant.

The flow rate variable unit (electric water pump 23) varies the flow rate of the coolant taken into the coolant junction unit (MCV 22B), and circulates the coolant in at least any of the first flow path (flow path P1), the second flow path (flow path P2), and the third flow path (flow path P3).

For example, the MCV 22B includes three inflow valves V11, V12, and V13 into which the coolant flows from the radiator 21, the cylinder head 25, and the heater 27, respectively, and one outflow valve V10 from which the coolant flows out to the electric water pump 23. Therefore, the coolant temperature change control unit 35 controls the operation of the MCV 22B according to the stop or operation of the engine 13 to change the valve opening degrees of the three inflow valves V11, V12, and V13 so that the temperature of the coolant changes to the target coolant temperature.

The normal flow path P0 includes a flow path from the water outlet 26 toward the heater 27 in addition to a flow path from the water outlet 26 toward the radiator 21. The flow path P3 into which the coolant warmed by the heater 27 flows is shown from the heater 27 to the MCV 22B. Whether the coolant having passed through the heater 27 flows into the MCV 22B depends on the control of the coolant temperature change control unit 35. That is, in a state where the inflow valves V12 and V13 of the MCV 22B are closed, the coolant does not flow through the flow paths P2 and P3, and thus the coolant remains in the normal flow path P0.

Figure 12A:
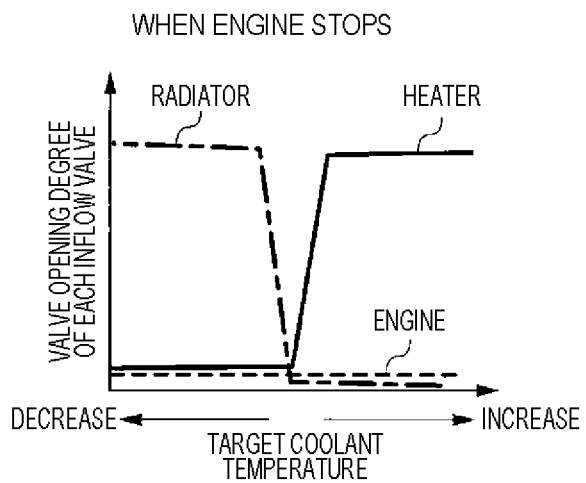
FIGS. 12A and 12B are graphs illustrating an example of a change in the valve opening degree of each inflow valve with respect to the temperature of the coolant according to the fifth embodiment of the invention.
Figure 12B:
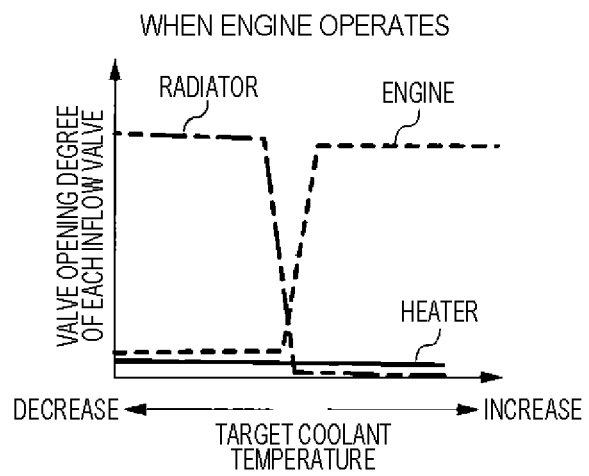

FIG. 12 is a graph illustrating an example of a change in the valve opening degree of each of the inflow valves V11, V12, and V13 with respect to the temperature of the coolant.

The coolant temperature change control unit (coolant temperature change control unit 35) operates the coolant junction unit (MCV 22B) such that the coolant flowing in from the second flow path (flow path P2) is larger than the coolant flowing in from the first flow path and the third flow path (Flow paths P1 and P3) when the internal combustion engine (engine 13) is stopped and the target coolant temperature is controlled to decrease, or operates the coolant junction unit (MCV 22B) such that the coolant flowing in from the third flow path (flow path P3) is larger than the coolant flowing in from the first and second flow paths (flow path P1 and P2) when the target coolant temperature is controlled to increase. Further, the coolant temperature change control unit (coolant temperature change control unit 35) operates the coolant junction unit (MCV 22B) such that the coolant flowing in from the second flow path (flow path P2) is larger than the coolant flowing in from the first flow path and the third flow path (Flow paths P1 and P3) when the internal combustion engine (engine 13) operates and the target coolant temperature is controlled to decrease, or operates the coolant junction unit (MCV 22B) such that the coolant flowing in from the first flow path (flow path P1) is larger than the coolant flowing in from the second and third flow paths (flow path P2 and P3) when the target coolant temperature is controlled to increase.

The graph (1) of FIG. 12 shows a change in the valve opening degree of the MCV 22B when the engine 13 is stopped. In the graph (1), the horizontal axis represents the target coolant temperature, and the vertical axis represents the valve opening degree of each inflow valve of the MCV 22B. When the target coolant temperature is determined to be low (lowered), the coolant temperature change control unit 35 increases the valve opening degree of the inflow valve V12 (abbreviated as "radiator inflow valve") into which the coolant flows from the radiator 21 so that the coolant flows to the radiator 21. Conversely, the coolant flowing through the engine 13 and the heater 27 may be small. Therefore, the coolant temperature change control unit 35 narrows the valve opening degrees of the inflow valve V11 (abbreviated as "engine inflow valve") into which the coolant flows from the engine 13 and the inflow valve V13 (abbreviated as "heater inflow valve") into which the coolant flows from the heater 27.

On the other hand, when the target coolant temperature is determined to be high (raised), the coolant temperature change control unit 35 increases the valve opening degree of the heater inflow valve so that the coolant flows to the heater 27 to be heated. Therefore, the temperature of the coolant warmed by the heater 27 quickly reaches the target coolant temperature. Conversely, since the amount of the coolant flowing through the engine 13 and the radiator 21 may be small, the coolant temperature change control unit 35 narrows the valve opening degrees of the radiator inflow valve and the engine inflow valve. Therefore, it is possible to prevent the coolant from circulating through the radiator 21 and being cooled too much.

The graph (2) of FIG. 12 illustrates a change in the valve opening degree of the MCV 22B during the operation of the engine 13. Also in the graph (2), the horizontal axis represents the target coolant temperature, and the vertical axis represents the valve opening degree of the MCV 22B. When the target coolant temperature is determined to be low (lowered), the valve opening degree of the radiator inflow valve is widened in the graph (2) of FIG. 12 as in the graph (1) of FIG. 12.

On the other hand, when the target coolant temperature is determined to be high (raised), the coolant temperature change control unit 35 increases the valve opening degree of the engine inflow valve so that the coolant flows to the engine 13 to be heated. Therefore, the coolant is warmed by the engine 13, and the temperature of the coolant quickly reaches the target coolant temperature. Conversely, the radiator 21 is used to cool the coolant, and the heater 27 has an insufficient amount of heat to raise the temperature of the coolant. Therefore, since the amount of the coolant flowing through the radiator 21 and the heater 27 may be small, the coolant temperature change control unit 35 narrows the valve opening degrees of the radiator inflow valve and the heater inflow valve. Therefore, the coolant can be warmed by the amount of heat generated by the engine 13.

In the VCU 1 according to the fifth embodiment described above, the coolant temperature change control unit 35 changes the valve opening degrees of the inflow valves V11, V12, and V13, which are opened by the MCV 22B, depending on whether the engine 13 is stopped or operated. When the target coolant temperature decreases, the radiator inflow valve is opened and the coolant flowing into the radiator 21 is cooled regardless of whether the engine 13 is stopped or operated. On the other hand, if the target coolant temperature rises when the engine 13 is stopped, the heater inflow valve is opened to warm the coolant flowing into the heater 27. For example, when the temperature drops in winter or the like, the coolant warmed by the heater 27 circulates through the engine 13, so that the engine 13 can be easily started.

When the target coolant temperature rises during operation of the engine 13, the coolant temperature change control unit 35 widens the engine inflow valve to warm the coolant flowing into the engine 13. Therefore, the time until the temperature of the coolant reaches the target coolant temperature can be shortened.

Sixth Embodiment

Next, a cooling system according to a sixth embodiment of the invention will be described. In the cooling system according to this embodiment, the engine 13 is cooled according to the load of the engine 13 by cooling the internal combustion engine piston with oil (coolant) injected by the oil jet.

Figure 13:
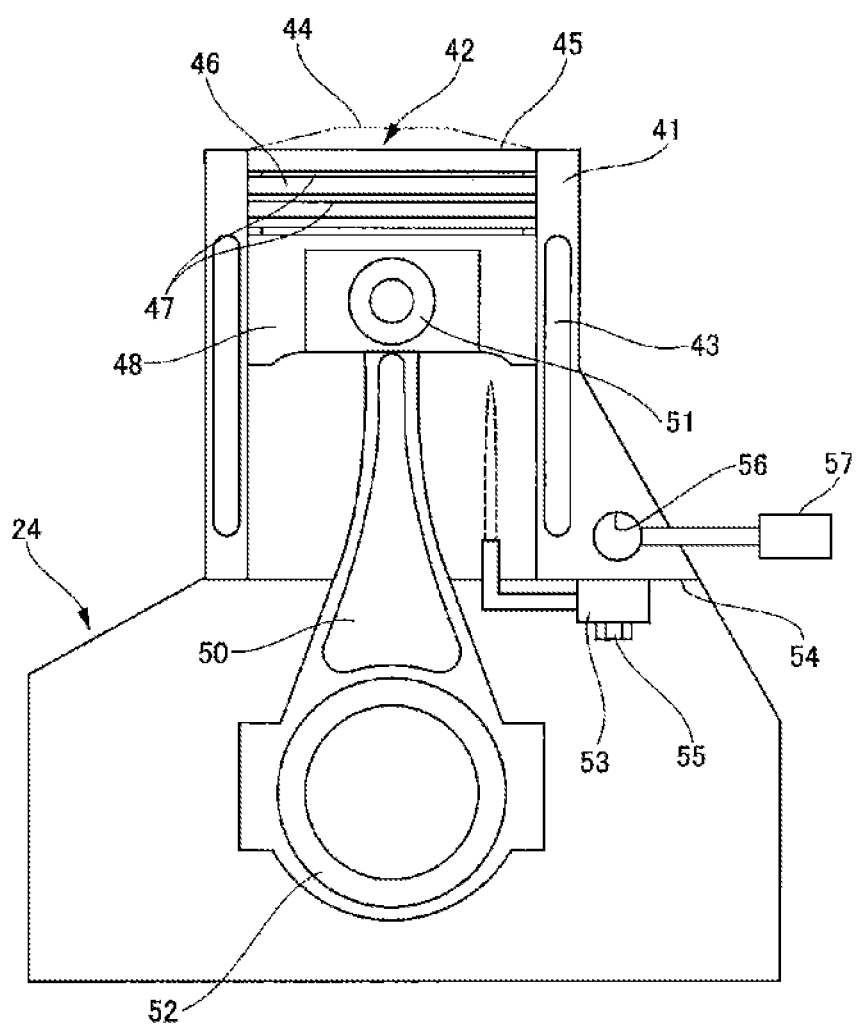
FIG. 13 is a cross-sectional view illustrating an example of an internal combustion engine to which an internal combustion engine oil jet according to a sixth embodiment of the invention is applied.

FIG. 13 is a cross-sectional view illustrating an example of an internal combustion engine to which an internal combustion engine oil jet is applied.

The cylinder block 24 and the cylinder head 25 illustrated in FIG. 3 are provided inside an internal combustion engine illustrated as the engine 13. In FIG. 13, the cylinder head 25 is not illustrated.

The coolant temperature change unit whose operation is controlled by the coolant temperature change control unit 35 includes a coolant injection unit (oil jet 53) that injects the coolant to the piston (piston 42) of the internal combustion engine (engine 13) and a variable displacement coolant feeding unit (variable displacement oil pump 57) that varies the flow rate of the coolant injected by the coolant injection unit (oil jet 53).

A cylindrical cylinder liner 41 is provided inside the cylinder block 24, and a piston 42 is disposed inside the cylinder liner 41 so as to be able to reciprocate. The cylinder liner 41 is provided with a water jacket 43 through which the coolant flows.

The piston 42 is cast in a bottomed cylindrical shape using a metal material such as an aluminum alloy or cast iron.

In a piston upper portion 46 having a piston crown surface 45 facing a combustion chamber 44 formed above the piston 42, a plurality of ring grooves 47 are recessed over the entire circumference in the circumferential direction. A piston ring (not shown) is attached to each ring groove 47, and this piston ring seals a gap with the inner surface of the cylinder liner 41 and scrapes off engine oil adhering to the inner surface of the cylinder liner 41. A cylindrical skirt 48 extending downward in a thrust/anti-thrust direction orthogonal to a piston pin 51 is provided below the piston 42, and tilting of the piston is suppressed by a skirt 48.

The pin boss portion of the piston 42 and the upper end of the connecting rod 50 are relatively rotatably connected by a piston pin 51 inserted therethrough, and the lower end of the connecting rod 50 is rotatably attached to the crank pin 52 of the crankshaft. Therefore, the pressure (load) of the combustion gas ignited in the combustion chamber 44 facing the piston crown surface 45 is transferred to the crank pin 52 of the crankshaft via the piston pin 51 and the connecting rod 50.

The oil jet 53 as a cooling device for an internal combustion engine piston is attached to the cylinder block 24. The oil jet 53 has a function of cooling the piston 42 by injecting and supplying engine oil toward the back surface side of the piston 42. The oil jet 53 is fastened and fixed to an attachment surface 54 at the lower end of the cylinder liner 41 using a fixing bolt 55 so as to avoid interference with the connecting rod 50, the crankshaft, and the like. The flow rate of the oil jetted by the oil jet 53 is changed by the variable displacement oil pump 57 connected to the oil jet 53.

The cylinder block 24 is provided with an oil supply passage 56 for supplying engine oil to an oil supply portion including the oil jet 53. Although not illustrated, the engine oil stored in an oil pan provided below the internal combustion engine is pressurized by an oil pump, and is supplied to a lubricating portion, a hydraulic operating device, and the like in addition to the oil jet 53 via the oil supply passage 56.

Typical structures of the oil jet 53 include a die-cast type, a brazed 2-piece type, and a brazed integration type. In the case of the die-cast type and the brazed 2-piece type, typically, the oil jet 53 is fastened and fixed to the cylinder block 24 by a fixing bolt incorporating a check ball. When a valve mechanism is incorporated in the brazed integration type, the oil jet 53 is fixed to the cylinder block side by a general fixing bolt not incorporating a check ball.

The check ball is biased by a spring in a direction of closing the oil supply passage 56, and when the hydraulic pressure of the engine oil in the oil supply passage 56 (main gallery) exceeds a set load of the spring, the engine oil is supplied to the oil jet 53. That is, the oil jet 53 is configured such that the engine oil is spontaneously injected when the oil pressure of the engine oil supplied to the oil supply passage 56 of the internal combustion engine becomes equal to or higher than a predetermined value. The engine oil flowing into the oil jet 53 is injected to the back surface side of the piston crown surface 45 through a pipeline inside the oil jet 53. Therefore, the engine oil is used as an example of a coolant for cooling the piston 42.

Figure 14:
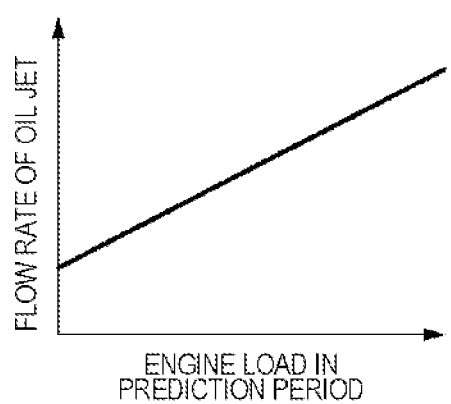
FIG. 14 is a graph illustrating a relationship of a flow rate of an oil jet with respect to an engine load in a prediction period according to the sixth embodiment of the invention.

FIG. 14 is a graph illustrating the relationship between the flow rate of the oil jet 53 and the engine load in the prediction period.

The coolant temperature change control unit (coolant temperature change control unit 35) operates the variable displacement coolant feeding unit (variable displacement oil pump 57) so that the coolant injection unit (oil jet 53) injects the coolant (oil) at a smaller flow rate as the predicted output of the internal combustion engine (engine 13) is lower, or operates the variable displacement coolant feeding unit (variable displacement oil pump 57) so that the coolant injection unit (oil jet 53) injects the coolant (oil) at a larger flow rate as the predicted output of the internal combustion engine (engine 13) is higher.

In the graph of FIG. 14, the horizontal axis represents the engine load in the prediction period, and the vertical axis represents the flow rate of the oil jet 53. When the engine load in the prediction period in the prediction period, that is, the engine output of the engine 13 is low, the flow rate of the oil jet 53 may be reduced because the amount of heat of the cylinder block 24 is also small. On the other hand, since the amount of heat of the cylinder block 24 increases as the engine output of the engine 13 increases, it is required to cool the cylinder block 24. Here, in each of the above-described embodiments, the engine 13 is cooled by causing the coolant to flow to the engine 13, but in this embodiment, the cooling of the engine 13 is assisted by further increasing the flow rate of the oil jet 53. Therefore, the engine 13 is efficiently cooled by the coolant and the oil jet.

In the cooling system according to the sixth embodiment described above, the VCU 1 controls the variable displacement oil pump 57 to change the flow rate of the oil jet 53 injected by the oil jet 53, thereby cooling the cylinder block 24. At this time, since the oil jet cools the cylinder block 24 together with the coolant, the temperature of the coolant easily reaches the target coolant temperature, and the coolant can efficiently cool the engine 13 including the cylinder block 24.

Modifications

Note that the hybrid vehicle 100 on which the VCU 1 according to each of the above-described embodiments is mounted is a series hybrid vehicle, but may be various forms of hybrid vehicles such as a parallel hybrid vehicle and a plug-in hybrid vehicle. Further, the VCU 1 is not limited to the hybrid vehicle 100, and may be mounted on a vehicle including only an engine.

In addition, masking may be performed without performing the processing of changing the target coolant temperature in each of the above-described embodiments. For example, when the stop time of the hybrid vehicle 100 becomes long, it becomes difficult to predict the output of the engine 13. Therefore, when the time during which the vehicle (hybrid vehicle 100) stops is a predetermined time or more, the internal combustion engine output prediction unit (engine output prediction unit 32) notifies the target coolant temperature determination unit (target coolant temperature determination unit 33) that the output of the internal combustion engine (engine 13) cannot be predicted. When the target coolant temperature determination unit (target coolant temperature determination unit 33) is notified that the output of the internal combustion engine (engine 13) cannot be predicted, the target coolant temperature determination unit fixes the target coolant temperature to a predetermined value. As a result, for example, the operation of the coolant temperature change unit is controlled so that the coolant temperature becomes the target coolant temperature fixed at 80 degrees. Thereafter, when the hybrid vehicle 100 starts to move, the process of changing the target coolant temperature in each embodiment may be resumed.

Further, the navigation device 11 has been described as being mounted on the hybrid vehicle 100, but a navigation function of a mobile terminal (not illustrated) carried by a driver or a passenger of the car may be used. Then, the VCU 1 may perform prediction of the engine output, determination of the target coolant temperature, and control for setting the coolant temperature to the target coolant temperature on the basis of the position information received from the mobile terminal and the map information including the route to the destination.

In addition, the invention is not limited to each embodiment described above, and it goes without saying that various other application examples and modifications can be taken without departing from the gist of the invention described in the claims.

For example, the above embodiments are described in detail for easy understanding the invention, but not necessarily limited to those including all the configurations described. In addition, some of the configurations of a certain embodiment may be replaced with the configurations of the other embodiments, and the configurations of the other embodiments may be added to the configurations of a certain embodiment. In addition, some of the configurations of each embodiment may be omitted, replaced with other configurations, and added to other configurations.

In addition, only control lines and information lines considered to be necessary for explanation are illustrated, but not all the control lines and the information lines for a product are illustrated. In practice, almost all the configurations may be considered to be connected to each other.

REFERENCE SIGNS LIST

1 VCU
2 ECU
3 GCU
4 BCU
5 MCU
13 engine
18 motor
21 radiator
22 electric thermostat
23 electric water pump
24 cylinder block
25 cylinder head
31 engine output control unit
32 engine output prediction unit
33 target coolant temperature determination unit
34 change timing setting unit
35 coolant temperature change control unit
100 hybrid vehicle

The invention claimed is:

1. A control device mounted on a vehicle including an internal combustion engine as a drive source, the control device comprising:
   an internal combustion engine output control unit that outputs internal combustion engine control information for controlling an output of the internal combustion engine to the internal combustion engine;
   an internal combustion engine output prediction unit that predicts an output of the internal combustion engine in a future prediction period based on position information of the vehicle acquired from a positioning unit that measures a position of the vehicle, traffic information related to a route to a destination, and the internal combustion engine control information;
   a target coolant temperature determination unit that determines a target coolant temperature, which is a target temperature of a coolant for cooling the internal combustion engine, based on the predicted output of the internal combustion engine;
   a change timing setting unit that sets a change timing for changing a temperature of the coolant to the target coolant temperature based on the predicted output of the internal combustion engine; and
   a coolant temperature change control unit that controls an operation of a coolant temperature change unit that changes a temperature of the coolant at the change timing based on the predicted output of the internal combustion engine so as to reach the target coolant temperature.

2. The control device according to claim 1,
   wherein the output of the internal combustion engine is changed according to a load of the internal combustion engine in the prediction period,
   wherein the target coolant temperature determination unit determines the target coolant temperature to be higher as the predicted output of the internal combustion engine is lower, and determines the target coolant temperature to be lower as the predicted output of the internal combustion engine is higher, and
   wherein the change timing setting unit sets, as the change timing, a timing at which the predicted output of the internal combustion engine is switched from a low output to a high output or a timing at which the predicted output of the internal combustion engine is switched from a high output to a low output.

3. The control device according to claim 2,
   wherein the change timing setting unit sets, as the change timing, a timing earlier than a timing at which the output of the internal combustion engine is switched from a high output to a low output when it is predicted by the internal combustion engine output prediction unit that a time during which the internal combustion engine stops is equal to or longer than a set time after the output of the internal combustion engine is switched from a high output to a low output.

4. The control device according to claim 3,
   wherein the coolant temperature change unit includes a coolant junction unit that is provided to be able to take the coolant into a merging portion of a first flow path through which the coolant circulates in the internal combustion engine and a second flow path through which the coolant circulates in the internal combustion engine and a radiator, opens a valve to allow the coolant to flow in from the second flow path according to a temperature of the coolant, and merges and takes the coolant, and a flow rate variable unit that varies a flow rate of the coolant taken into the coolant junction unit and circulates the coolant in the first flow path or the second flow path.

5. The control device according to claim 4, wherein the coolant temperature change control unit operates the coolant junction unit at a higher coolant temperature as the predicted output of the internal combustion engine is lower to circulate the coolant to the first flow path, and reduces the flow rate of the coolant flowing out from the flow rate variable unit, or operates the coolant junction unit at a lower coolant temperature as the predicted output of the internal combustion engine is higher to circulate the coolant to the second flow path, and increases the flow rate of the coolant flowing out from the flow rate variable unit.

6. The control device according to claim 3, wherein the coolant temperature change unit includes a coolant junction unit that is provided to be able to take the coolant into a merging portion of a first flow path through which the coolant circulates in the internal combustion engine and a second flow path through which the coolant circulates in the internal combustion engine and a radiator, opens a valve to allow the coolant to flow in from at least one of the first flow path and the second flow path, and merges and takes the coolant; and a flow rate variable unit that varies a flow rate of the coolant taken into the coolant junction unit and circulates the coolant in at least one of the first flow path and the second flow path.

7. The control device according to claim 6, wherein the coolant temperature change control unit operates the coolant junction unit such that the coolant flowing in from the first flow path becomes larger than the coolant flowing in from the second flow path as the predicted output of the internal combustion engine is lower, and wherein the coolant temperature change control unit reduces the flow rate of the coolant flowing out of the flow rate variable unit, or operates the coolant junction unit such that the coolant flowing in from the first flow path becomes smaller than the coolant flowing in from the second flow path as the predicted output of the internal combustion engine is higher, and increases the flow rate of the coolant flowing out from the flow rate variable unit.

8. The control device according to claim 3, wherein the coolant temperature change unit includes a heater that warms the coolant, a coolant junction unit that is provided to be able to take in the coolant to a merging portion of a first flow path through which the coolant circulates the internal combustion engine, a second flow path through which the coolant circulates the internal combustion engine and a radiator, and a third flow path through which the coolant circulates the heater, opens a valve to allow the coolant to flow in from at least any of the first flow path, the second flow path, and the third flow path, and merges and takes in the coolant, and a flow rate variable unit that varies the flow rate of the coolant taken into the coolant junction unit and circulates the coolant in at least any of the first flow path, the second flow path, and the third flow path.

9. The control device according to claim 8, wherein the coolant temperature change control unit performs control to operate the coolant junction unit such that the coolant flowing in from the second flow path is larger than the coolant flowing in from the first flow path and the third flow path when the internal combustion engine is stopped and the target coolant temperature is controlled to decrease, or to operate the coolant junction unit such that the coolant flowing in from the third flow path is larger than the coolant flowing in from the first flow path and the second flow path when the target coolant temperature is controlled to increase, or wherein the coolant temperature change control unit operates the coolant junction unit such that the coolant flowing in from the second flow path is larger than the coolant flowing in from the first flow path and the third flow path when the internal combustion engine is operating and the target coolant temperature is controlled to decrease, or operates the coolant junction unit such that the coolant flowing in from the first flow path is larger than the coolant flowing in from the second flow path and the third flow path when the target coolant temperature is controlled to increase.

10. The control device according to claim 3, wherein the coolant temperature change unit includes:

a coolant injection unit that injects the coolant to a piston of the internal combustion engine; and a variable displacement coolant feeding unit that varies a flow rate of the coolant injected by the coolant injection unit, wherein the coolant temperature change control unit operates the variable displacement coolant feeding unit such that the coolant injection unit injects the coolant at a smaller flow rate as the predicted output of the internal combustion engine is lower, or operates the variable displacement coolant feeding unit such that the coolant injection unit injects the coolant at a larger flow rate as the predicted output of the internal combustion engine is higher.

11. The control device according to claim 2, wherein the internal combustion engine output prediction unit predicts a maximum value of the output of the internal combustion engine in the prediction period as the output of the internal combustion engine.

12. The control device according to claim 2, wherein the internal combustion engine output prediction unit predicts, as the output of the internal combustion engine, an average value of the output of the internal combustion engine obtained every time shorter than a time required to change to the target coolant temperature in the prediction period, and wherein the target coolant temperature determination unit determines the target coolant temperature to be high when the average value is equal to or less than a set average value, and determines the target coolant temperature to be low when the average value exceeds the set average value.

13. The control device according to claim 2, wherein the internal combustion engine output prediction unit predicts an output of the internal combustion engine in the prediction period based on a vehicle speed of the vehicle, and the vehicle speed when the vehicle travels on an expressway is higher than a value when the vehicle travels in an urban area.

14. The control device according to claim 1,
wherein the internal combustion engine output prediction unit notifies the target coolant temperature determination unit that the output of the internal combustion engine cannot be predicted when the time during which the vehicle stops is equal to or longer than a predetermined time, and wherein the target coolant temperature determination unit fixes the target coolant temperature to a predetermined value when notified that the output of the internal combustion engine cannot be predicted.

15. The control device according to claim 1, wherein the vehicle travels by an output of at least one of the internal combustion engine and an electric drive unit.

\* \* \* \* \*